June 8, 1954  D. H. MONTGOMERY ET AL  2,680,281
TURRET LATHE
Filed Nov. 17, 1950  6 Sheets-Sheet 1
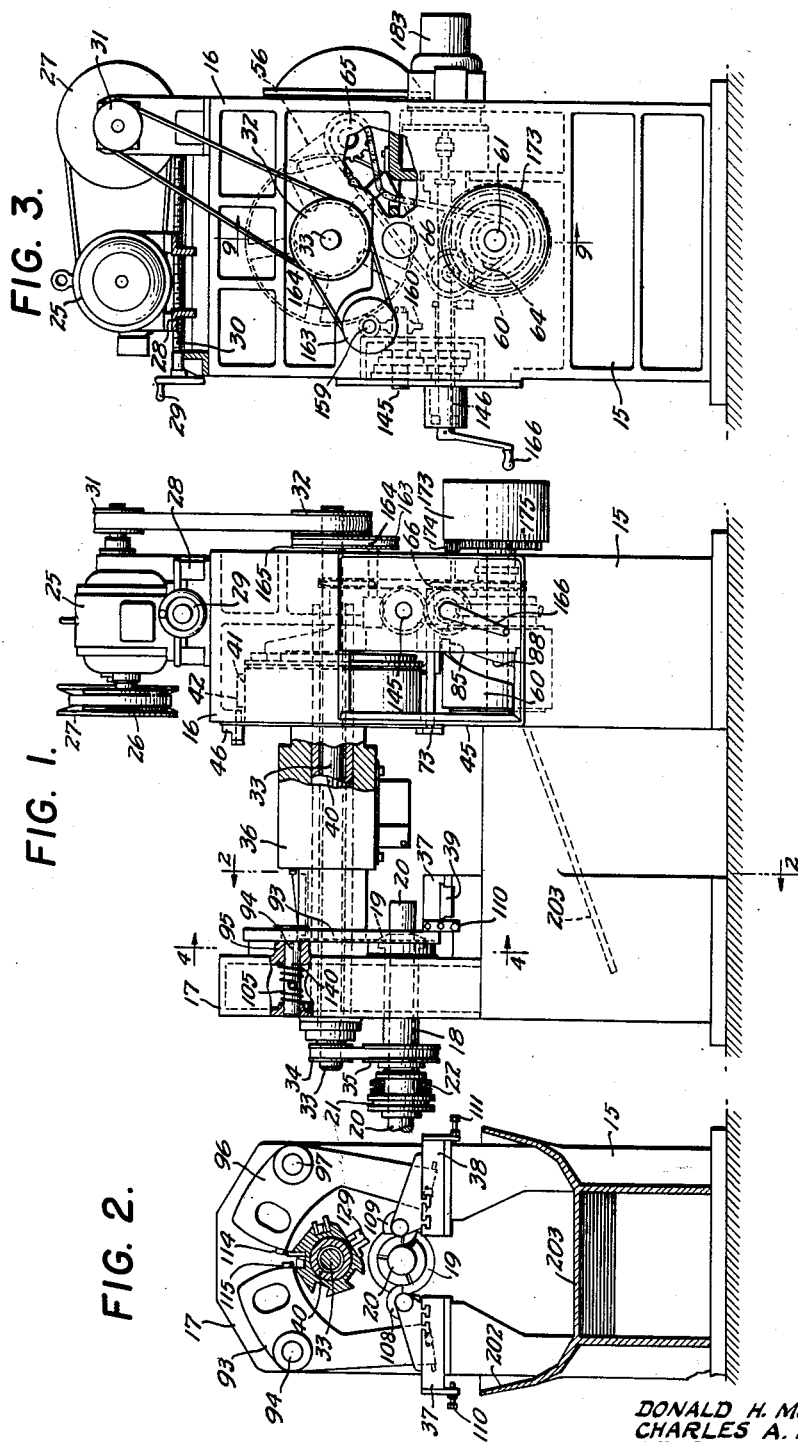
INVENTORS
DONALD H. MONTGOMERY
CHARLES A. PETHYBRIDGE
GEORGE H. LANGE
BY Mitchell Bechert
ATTORNEYS

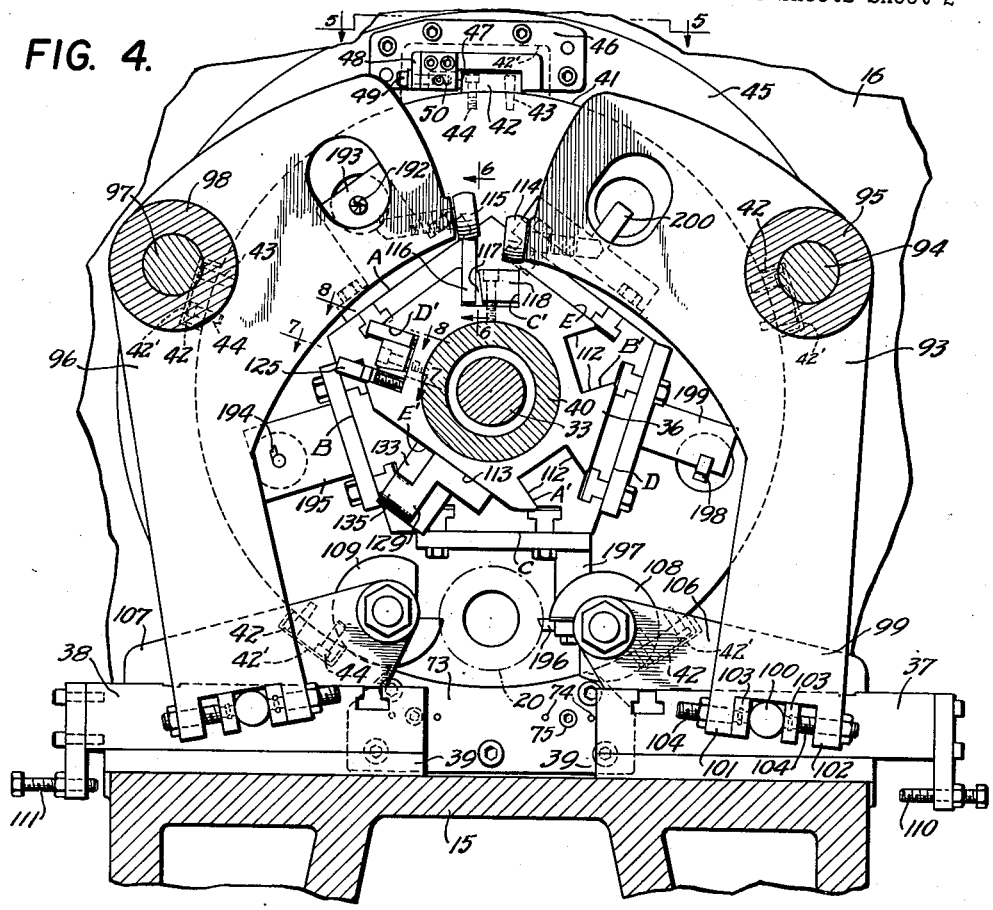

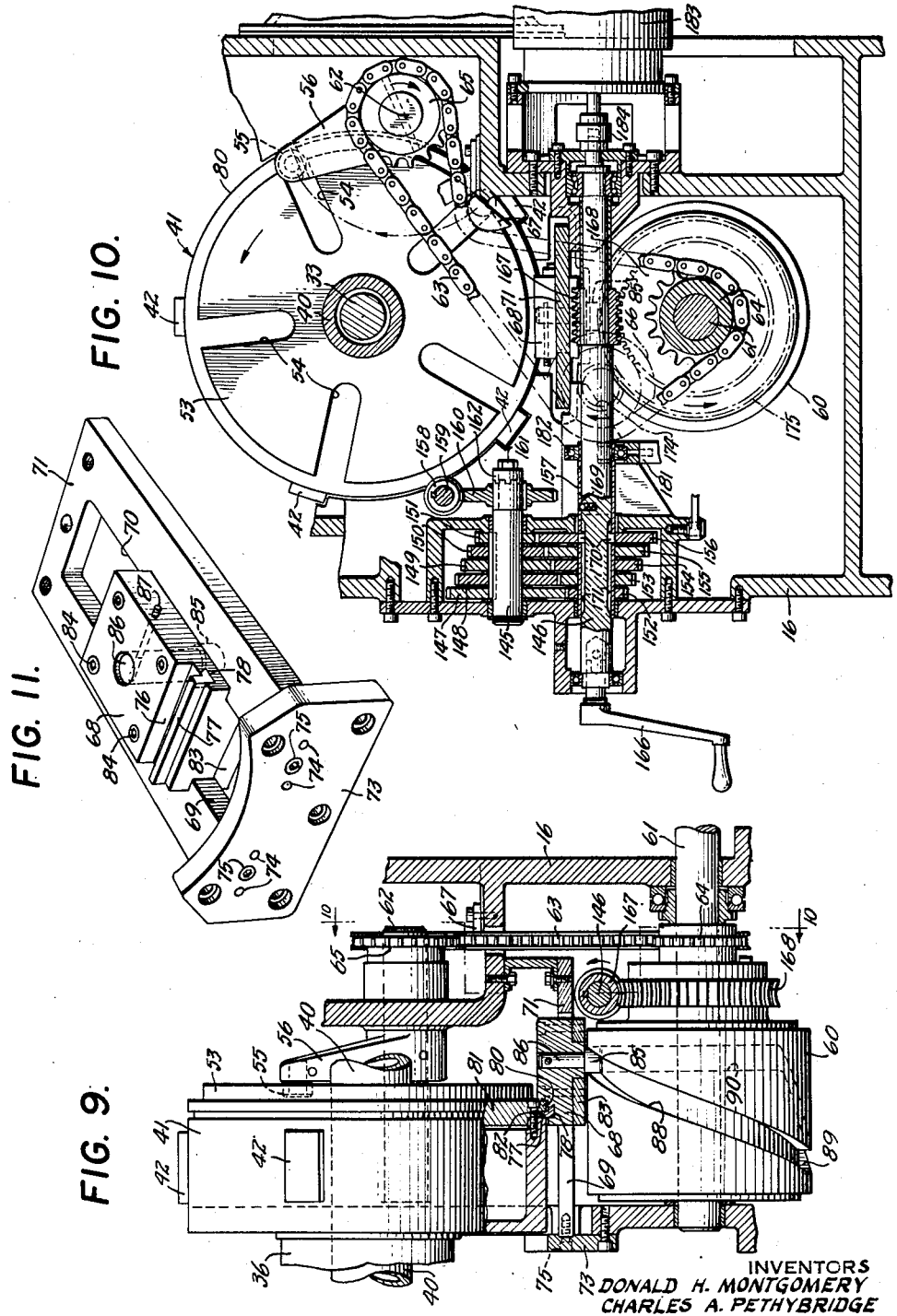

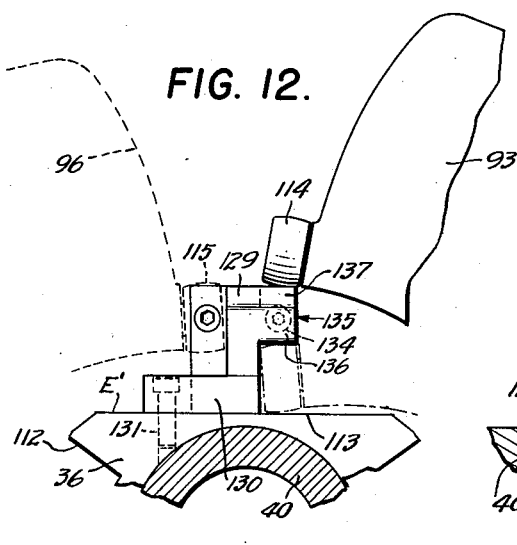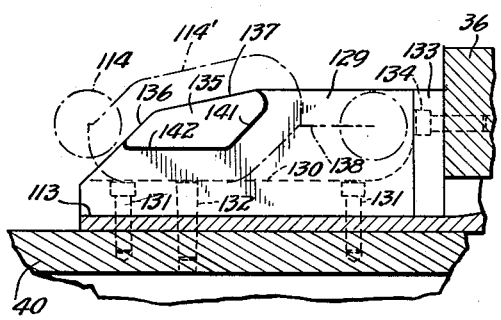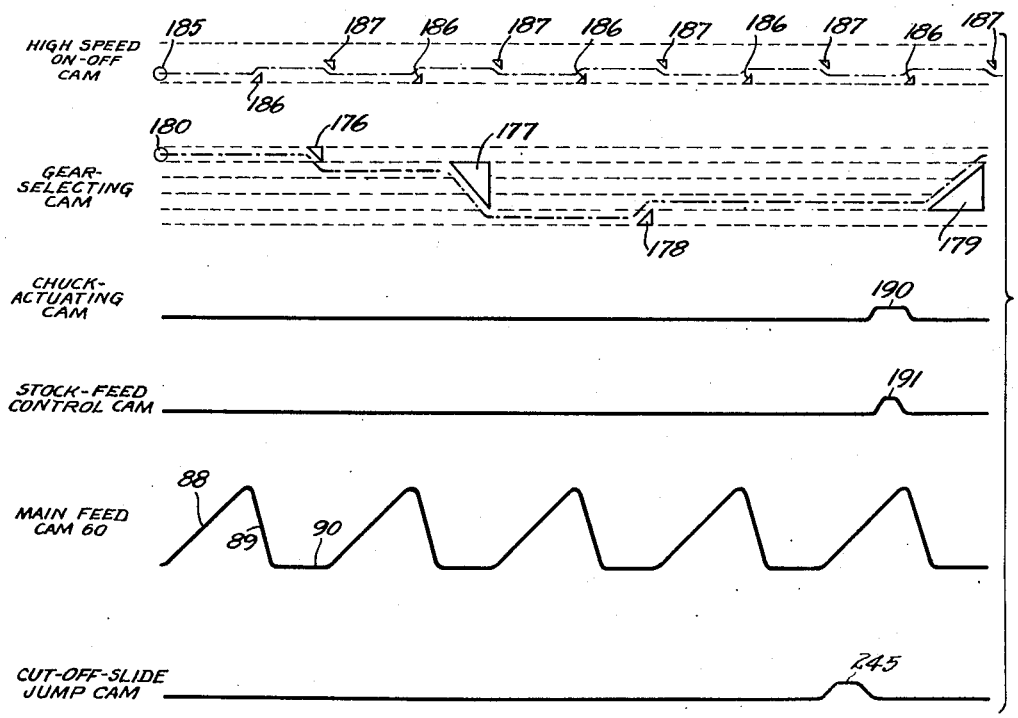

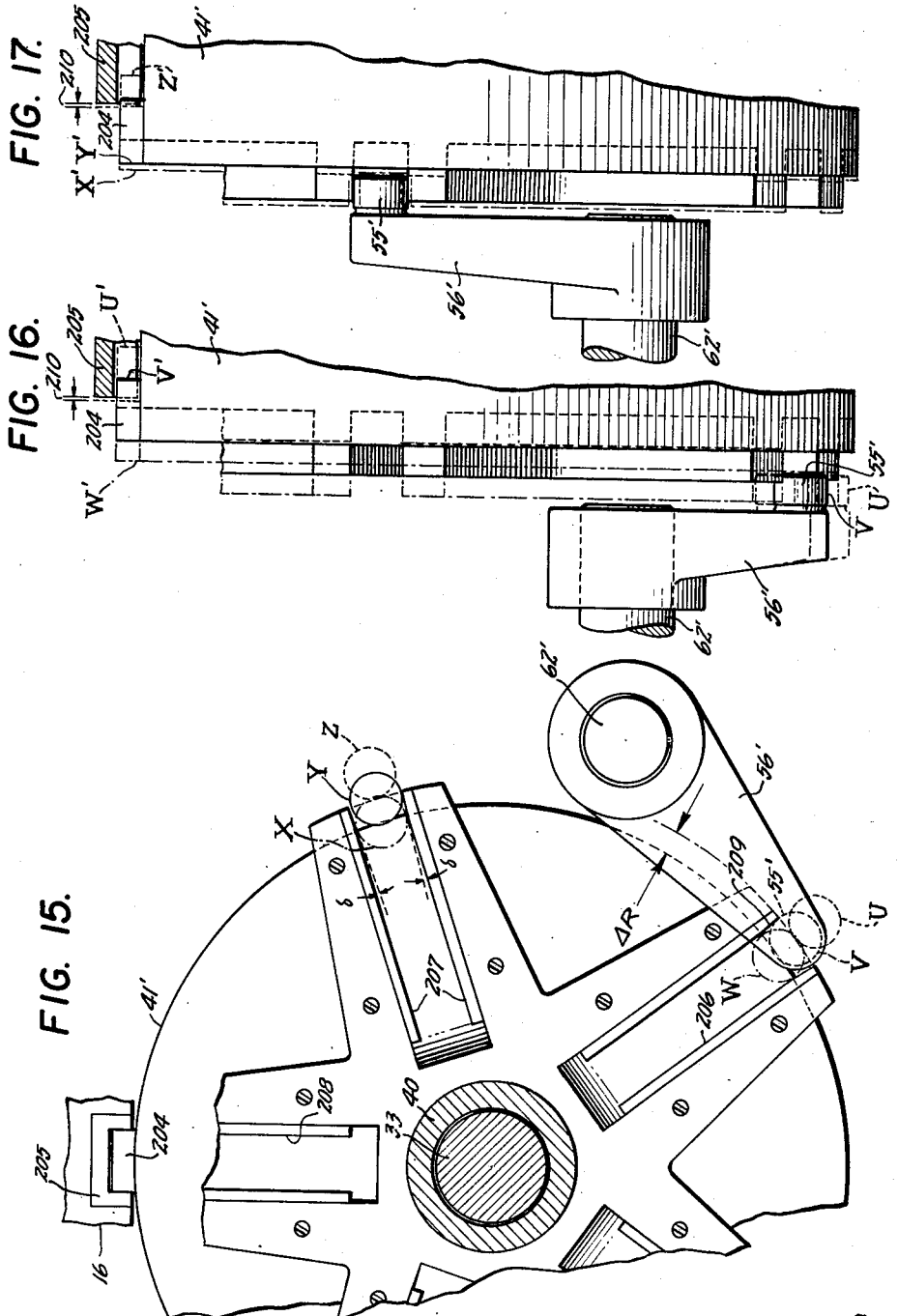

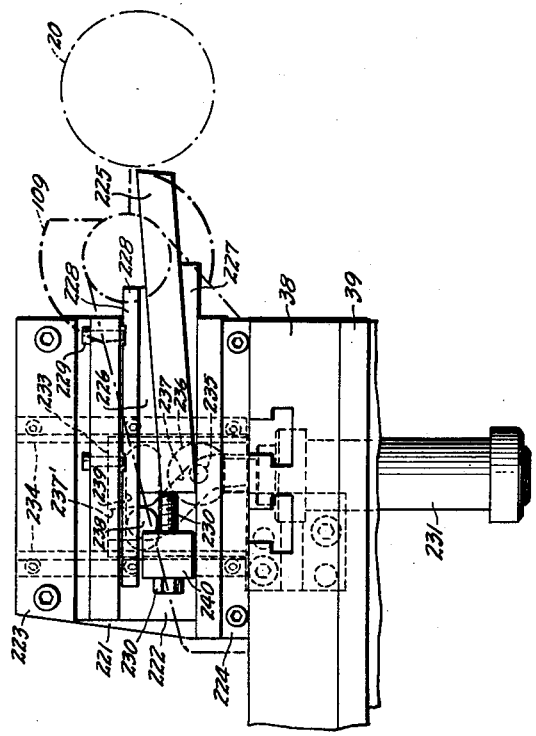
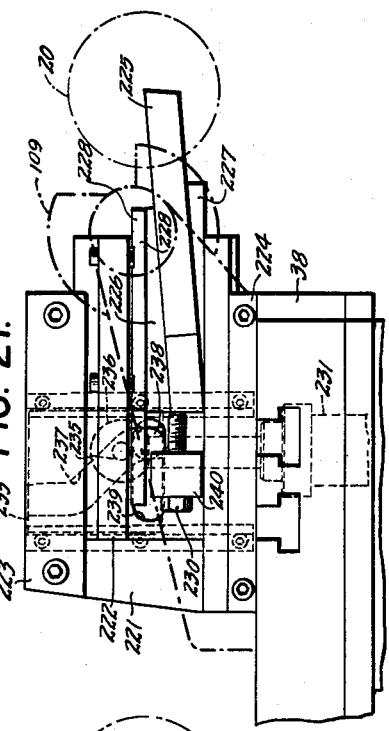
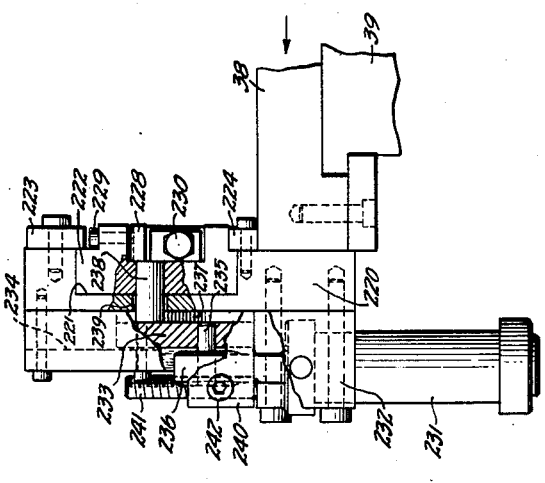
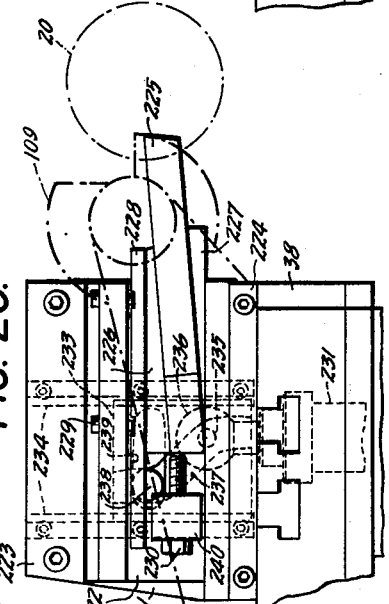

Patented June 8, 1954

2,680,281

UNITED STATES PATENT OFFICE 2,680,281

TURRET LATHE

Donald H. Montgomery, Torrington, Charles A. Pethybridge, New Britain, and George H. Lange, West Hartford, Conn., assignors to The New Britain Machine Company, New Britain, Conn., a corporation of Connecticut Application November 17, 1950, Serial No. 196,108

24 Claims. (Cl. 29—39)

Our invention relates to an automatic machine tool, such as a turret lathe.

It is an object of the invention to provide an improved machine of the character indicated.

It is another object to provide improved feed means for various types of tool slides on a machine of the character indicated.

It is also an object to provide improved indexing means for the turret of such a machine.

It is a further object to provide improved means for synchronizing feeding, locating, and indexing functions for the turret of a machine of the character indicated.

It is another object to provide an improved slide-actuating mechanism whereby one slide may perform different operations at each of a plurality of different indexed stations of another slide.

Another object is to provide an improved speed-changing mechanism for feeds in a machine of the character indicated.

Also, it is an object to provide improved means for speeding the index of the machine of the character indicated.

It is a specific object to provide a simplified machine including a turret, with definite angular control of the turret at all times, even when such angular control is transferred from one mechanism to another.

It is a general object to meet the above objects with a basically simple mechanism permitting great flexibility of use and providing a maximum of synchronization between all functions regardless of the set-up of the machine.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a simplified front elevation of a machine incorporating features of the invention, with certain parts broken-away and in section;

Fig. 2 is a vertical sectional view in the plane 2—2 of Fig. 1;

Fig. 3 is a right-end view of the machine of Fig. 1;

Fig. 4 is an enlarged sectional view taken more or less in the plane 4—4 of Fig. 1;

Fig. 5 is an enlarged fragmentary view of a detail of the locating mechanism, as viewed substantially in the plane 5—5 of Fig. 4;

Figs. 6, 7, and 8 are enlarged fragmentary sectional views in planes 6—6, 7—7, and 8—8 respectively, of Fig. 4, showing various cam arrangements;

Fig. 9 is a fragmentary generally longitudinal sectional view taken more or less in the plane 9—9 of Fig. 3;

Fig. 10 is a sectional view of the mechanism shown in Fig. 9 and taken substantially in the plane 10—10 of Fig. 9;

Fig. 11 is a perspective view of certain parts of the turret-feed mechanism of the machine;

Fig. 12 is an enlarged fragmentary view of cut-off means;

Fig. 13 is a side view of the parts shown in Fig. 12, as viewed from the right-hand side in the sense of Fig. 12;

Fig. 14 is a schematic program layout for various cooperating parts of the machine and depicting a full coordinated cycle of the machine;

Fig. 15 is a partly broken-away rear view of a modified turret-indexing mechanism incorporating features of the invention;

Figs. 16 and 17 are fragmentary right-end views of the assembly of Fig. 15, the parts being shown for different relationships in each case;

Fig. 18 is a side elevation of an improved tool slide for use in the present machine, viewed from generally the same aspect as is Fig. 2 and shown mounted in a retracted position prior to commencement of a cutting stroke;

Fig. 19 is a left-end view of the parts shown in Fig. 18; and

Figs. 20 and 21 are views similar to Fig. 18, the parts being shown in different relationships for different cutting strokes.

Briefly stated, our invention contemplates a turret-type lathe or the like wherein a simplified indexing mechanism is employed and wherein full synchronization is assured between the operation of the turret and of such other slides as may be utilized. In the arrangement to be described, we utilize a common feed for all the slides, and this may be realized by feeding one slide and by providing cooperating means between that one slide and the other slides for coordinating feeding movements of the other slides upon movement of the one slide. In the form to be described, the fed slide is indexible and includes means indexible therewith for producing a different feeding relation with each of the other slides for each of a plurality of indexed positions of the one slide, whereby the other slides may produce different feeding movements depending upon the indexed position of the turret. Our arrangement is such that the turret may always remain positively located in a given indexed position as long as there is to be any coordination between relative movements of the indexed slide and of the other slides. During this period of coordination, our arrangement is such that the indexing means may never be effective, and only after the indexible slide has been retracted out of possible feeding or other cooperation with the other slides is the indexible slide freed for possible indexing; provision may be made for definite angular control of the indexible slide at all times, including the period of transfer from control by the indexing means to control by locating means during a feed cycle. Improved means for producing a rapid cut-off, a rapid stock feed-out, and a rapid indexing, all without danger to tools, will also be described.

Referring to the drawings, our invention is shown in application to a horizontal-axis machine having a frame 15 which may rest upon the floor and which may include at one end a power case or housing 16 and at the other end a spindle case or pedestal 17. A spindle 18 may be supported for rotation on a horizontal axis in the pedestal 17, and the spindle 18 may support at the nose 19 thereof a hollow collet to be internally fed with bar or the like stock 20. The collet may be of the so-called drawback type actuable via a spool 21 in the tail of the spindle, and in the form shown two pairs of oppositely dished compression-spring washers 22 normally urge the spool 21 in the direction to produce chucking of stock 20. The stock 20 may be automatically fed out into a given working position by known mechanisms, as for example by the stock-feed mechanism shown in detail in the copending Patent 2,626,449 of D. H. Montgomery, granted January 27, 1953.

Continuous rotary drive for the spindle 18 may be derived from a motor 25 which is shown mounted on the top of power case 16. A drive pulley 26 may be on the motor shaft and belted to a driven pulley 27, forming part of a variable-speed drive. In the arrangement shown, the motor 25 is mounted on a slidable carriage 28, and manual means such as a hand crank 29 may turn a lead screw 30 in order to position the motor 25 as desired. One of the pulleys 26—27 may include oppositely dished conical side plates resiliently urged to each other so that, depending upon the manual adjustment of crank 29, various speed relationships may be established between the pulleys 26—27. Another pulley 31 on the shaft of pulley 27 may be belted to a pulley 32 on a main longitudinal drive shaft 33, which may run the full longitudinal length of the machine and which may, therefore, be journalled in the power case 16 and in the pedestal or outboard support 17. Pulleys or sprockets 34—35 on the main drive shaft 33 and on the spindle 18 may establish drive connections for continuously rotating the spindle 18.

In one form of the present machine, we have provided a number of slides for supporting tools to work on the stock 20. These slides may include a generally longitudinally movable slide 36 and two generally transversely movable slides 37—38. The slide 36 may in some respects resemble a so-called Gridley tool slide or turret and may, therefore, be supported for sliding movement on a tube or stem 40 anchored both in the power case 16 and in the pedestal or outboard support 17. The transversely movable slides 37—38 may each be supported in transverse guides or ways 39, which may be formed with or attached to the bed or base 15 of the machine.

In accordance with a feature of the invention, the indexing of the longitudinally movable slide 36 involves an indexing engagement directly with the slide 36 but only at a slide location representing substantial retraction of the slide away from the work 20. For substantially all other longitudinal positions of the slide 36, we provide means for locating the slide, and, since the slide may be moved out of engagement with the indexing means, the locating means may be relatively fixed. Thus, upon movement out of engagement with the indexing means, the slide 36 may be moved into engagement with the locating means and the locating means need involve no movable parts.

In the form shown, turret indexing and locating functions are all performed on an enlarged drum-like end 41 of the turret (Figs. 1, 4, 10). The drum 41 may be a separate part, but at least it should be rigidly secured to and permanently locked relatively to the slide 36. In the retracted position of the slide 36, the drum 41 preferably recedes into the power case 16.

The turret-locating function may be accomplished by means keying the drum 41 against rotation relatively to the frame, and, since the locating means is to lock the drum 41 and therefore the turret 36 against possible angular movement or play throughout a feeding cycle, the locating means is preferably effective for a substantial longitudinal part of the full movement or stroke of the slide 36. The locating means may include a longitudinal locating bar or key 42 provided in multiple, with one such bar or key for each indexed position of the turret 36. In the form shown, there are five such positions and therefore five bars or keys 42 (Fig. 4). The bar or keys 42 may be accurately angularly aligned with the drum 41, as by means of locating dowels 43 and, once located, such bars 42 may be permanently secured on the periphery of the drum 41, as by screws 44. Gates or openings 42' may be provided in the bore of the inside face 45 of the power case 16, and the locating bars 42 may pass with some degree of clearance through these openings 42', as during a feeding movement of the turret slide 36. At one of these openings 42', however, say at the upper opening, an accurately positioned locating and locking guide may be provided for reception of one of the keys 42. In Figs. 4 and 5, we show such a guide to include a frame member 46 doweled and bolted to the power case 16 and supporting a suitably inclined wedge shoe 47 to cooperate with a gib 48 so as accurately to define a locating channel for reception of the key 42. Screws 49—50 may serve to secure an adjusted position of the shoe 47.

It will be clear that in a full retracted position of the slide 36 the drum 41 will also be retracted and will be recessed into the power case, with the locating keys 42 retracted beyond and out of possible angular engagement with the locking and locating means 46—47. Upon a longitudinal advance of the slide 36, one of the keys 42 may cleanly enter the locating and locking channel, and thereafter the angular index setting of the slide 36 may be accurately held. If desired, the forward or leading corners of the locating keys 42 may be rounded off or beveled, as shown at 51 in Fig. 5, for assurance of a non-fouling entrance into the locating channel.

In accordance with a feature of the invention, the indexing means cannot be effective upon the slide 36 until the slide 36 has been substantially fully retracted or at least until the slide 36 substantially completes the period of engagement with the locating means 46—47. The indexing means may therefore include an element carried by the slide 36 for longitudinal reciprocation therewith and an element having substantially no freedom for longitudinal movement. In the form shown, the means carried with the slide 36 is in effect a Geneva wheel 53 which may be a separate plate or subassembly bolted on the back face of the drum 41 or which may be formed integrally with the drum 41 or slide 36, as shown. Even though the means 53 is shown integrally formed with the drum 41, it will, for the purpose of description, be referred to as Geneva-wheel means.

The Geneva-wheel means may include a plurality of generally radial open slots or grooves 54, for successive reception of the roll 55 of an indexing or Geneva arm 56. The Geneva arm 56 may be continuously driven from the main drive shaft 33 by a mechanism to be later described, and the longitudinal feed mechanism for the slide 36 may also be driven directly from the same source. Mechanical movement of the Geneva arm 56 and the feed of the slide 36 may thus be directly synchronized and coordinated, and, regardless of the selected speeds of these movements, it will be understood that upon the substantially complete retraction of the turret slide 36 the index roll 55 may be positioned for entry into one of the Geneva slots or grooves 54. During such entry (longitudinal and radial), the Geneva arm may assume angular positioning control of the turret slide 36 at the time that one of locating keys 42 disengages the locating means 46—47. The turret may then be free to follow the Geneva indexing movement as long as the arm 56 is in engagement with one of the Geneva slots 54. As the Geneva roll 55 is about to leave one of the Geneva slots 54, the turret-feed mechanism may effect a longitudinal feeding advance of the turret so as to reengage the locating means 46—47, and thus to hold a fixed angular turret position throughout the feed stroke. For safe and reliable operation, we prefer that the roll 55 shall have some clearance in the Geneva slots 54 and that there shall be a slight timing overlap between longitudinal entry of the Geneva roll into a Geneva slot and loss of the locating control by the means 46—47 in cooperation with one of the keys 42. Such overlap is preferably also effective at the commencement of feed and as the index roll 55 is about to leave an indexing slot 54. In any event it will be understood that commencement of indexing may be characterized by a tangential engagement (i. e. about the axis of Geneva arm 56) of the index roll 55 in one of the Geneva slots 54; termination of an indexing movement may also be characterized by a tangential engagement.

As indicated, we prefer that the indexing means and the feed means for the turret means shall be directly and continuously connected to the same driving mechanism, for assurance of synchronized operations. In the form shown, the turret feed is effected from a main feed cam 60 on a shaft 61, and the index shaft 62 is directly connected to the camshaft 61 by a chain 63 linking sprockets 64—65 on the shafts 61—62, respectively. An idler sprocket 66 may also be driven by the chain 63, and an adjustable slide or guide 67 may serve to carry the chain around certain parts of the frame and to provide a means for tightening the chain.

In accordance with a feature of the invention, feeds may be imparted directly to the turret 36 from the cam 60 through the medium of a slide block 68 (Figs. 9, 11). The block 68 may be guided between opposed parallel rails 69—70; and, in accordance with another feature of the invention, the guide means 69—70 is formed as a complete subassembly with the slide block 68 in order to permit accurate alignment of the parts before assembly into the machine proper. The guide assembly may include a spacer bar 71 permanently secured to the rails 69—70, and at the forward end of the guide assembly both rails 69—70 may be secured to a mounting plate 73. The securing means at the mounting plate may include for each of the rails one or more locating dowels 74 and a securing screw 75.

The slide block 68 may be recessed at its forward edge to define an upstanding shoulder 76 for direct abutment with the back edge of the drum 41 of the turret slide, and, if desired, an upstanding projection 77 may be carried in the recessed part for further (feeding and retracting) engagement with the drum 41. The upstanding projection 77 may be in the form of a specially hardened and separately formed member assembled to the slide block 68, as by insertion in a transverse groove of more or less dovetail configuration (see Figs. 9 and 11, at 78). The shoulder 76 and the upstanding member 77 may slidingly engage a flange or lip 80 at the back of the drum 41, and in the form shown a separate plate 81 is employed to define the flange 80. The plate 81 may be formed on its exposed side with the indexing grooves or slots 54 and may be secured, as at 82, by bolting against the back of the drum 41. For non-chattering guidance of the slide block 68, we provide a bottom retaining plate 83 which may be held in place by screws 84 passing through the block 68. The block 68 may carry a follower roll 85 to ride the cam slot of the feed cam 60, and a firm, well-journalled support for the roll 85 may be provided by a dowel or pin 86 extending the full thickness of the slide block 68. Set-screw means 87 may hold the pin 86 in place.

The feed cam 60 may be grooved to provide a single turret feed-and-retraction cycle for each revolution thereof, and in the form shown the cam program is characterized by a relatively long rise 88, followed by an abrupt decline 89, and including a dwell 90 (see Fig. 14) which dwell may occupy about one-third of the total rotation of the feed cam 60. It will be seen from Fig. 10 that an indexing function involving cooperation of the index arm 56 with one of the Geneva slots 54 may be completed in about one-third of a revolution, so that the feed cam 60 may hold the turret 36 retracted for a period permitting substantially a complete indexing of the turret from one station to the next succeeding station. Following an indexing of the turret 36, the feed surface or rise 88 of cam 60 may longitudinally propel the turret 36 away from the general radial plane of, and thus out of any possible engagement with, the indexing means 56 and into a feed stroke accurately located by one of the keys 42 in constant engagement with the locating means 46—47. After completion of the feed, the drawback surface 89 may forcibly retract the turret 36 at a more rapid pace, and as retraction becomes substantially complete, the turret 36 may pass from the angular control of the locating means 46—47 to the angular control (i. e. indexing) of the indexing arm 56.

In accordance with a further feature of the invention, the feed means utilized to feed one slide (e. g. turret 36) may also be utilized to feed the other slide means (37—38), and the feeding action of the other slides may be variously controlled in accordance with the indexed position of the one slide (36). In the form shown, the means utilized for this purpose includes means directly connecting the slides 36—37—38, so that the feed means 60—68 may feed the slide 36 and the slide 36 may be said to feed the slides 37—38.

In effecting the connection between slides 36 and 37—38, we utilize linkages involving bellcrank levers (Fig. 4); a first bellcrank 93 may be pivoted on a stud 94 carried in a boss 95 formed in the outboard support 17, and another bellcrank 96 may be similarly supported on a stud 97 in another boss 98 formed in the outboard support 17. In the case of each of the levers 93, 96 the lower and more extended arm, as at 99 in the case of the bellcrank 93, may be utilized for direct connection to one of the cross-slides (37), as by means of a pin or stud 100 carried by the cross-slide 37 and spanned by forked ends 101—102 of the bellcrank lower arm 99. Suitable abutment means 103 at the end of adjustment screws 104 in the forked ends 101—102 may provide a means for adjustably laterally relating bellcrank movement with cross-slide movement; upon suitable adjustment at 104, it will be clear that there need be no play between bellcrank movement and cross-slide movement.

For normal feeding purposes of the cross slide, it will ordinarily be satisfactory if the cross slides are positively fed toward the work and if cross-slide retraction is effected by suitable loading means, as for example resilient means. Such resilient means may include a torsion spring 105 (see Fig. 1) carried in the outboard support 17, effective between the frame of the outboard support 17, and a pin or similar projection on the rock shaft 94 to load the bellcrank 93 against the direct-acting feed means. It will be clear that similar loading means (not shown) may be provided for loading the action of the bellcrank 96 so as resiliently to oppose the direct action of the feed means for the cross slide 38.

Each of the cross slides may carry conventional tool-holder means, such as tool holders 106—107 for the support of circular tools 108—109 on slides 37—38, respectively. The tool 108 or a conventional blade may be considered as a cut-off tool and the tool 109 may be a forming tool. The tool slides 37—38 may carry externally accessible adjustable stop means 110—111, respectively, for direct abutment with a fixed element, such as a part of the frame 15, in order positively to limit the ultimate forward-fed position of each of the slides 37—38, as will be clear.

In the arrangement shown, the transfer of feed movement from the turret 36 to the bellcranks 93—96 is effected by longitudinal cams carried at the forward end of the turret 36. These cams may be held in suitable longitudinal recesses, as at 112 (Figs. 6, 7, 8), and such recesses may be provided one for each of the working stations of the turret. However, since we have shown a special type of cut-off means (to be described below) otherwise secured to the turret 36, we have provided but four cam-receiving grooves or recesses 112 and a flat 113 (Fig. 4) for the station at which final cut off is to be made.

For any particular indexed position of the turret slide 36, separate cams in grooves 112 may be followed separately by follower rolls 114—115 carried at the ends of the transverse arms of the bellcranks 93—96. In the particular station (C') that has been indexed to operating position in Fig. 4, but one cross-slide cam 116 is utilized, so that but one cross-slide (38) will be fed during the feed of turret 36 for such indexed position of the turret 36. The cam 116 may be held in place securely by means of a wedge 117 clamped by a block 118 screw-anchored into the body of the turret 36. Referring to Fig. 6, it will be seen that the cam 116 may comprise a bar of generally wedge-shaped configuration having a principal slope or rise 119 to intercept the follower roll 115 for actuating the cross-slide 38 during a feed movement of slide 36. In Fig. 6, we show in phantom outlines 115'—115'' the relative positions of the follower roll 115 and of the turret 36 for the extreme feed and retracted relations of the parts. It will be noted that the cam 116 has been adjusted so as to intercept follower 115 and thus to impart a cross-slide feed only toward the end of the turret-feed stroke. The cross-slide feed may be effected with a relatively steep inclination of the cam rise 119, and the operation at the index position (C') of the turret at which the cam 116 is effective may be a rough-forming operation. It will be noted that the cam 116 may carry at each end suitable adjustment means such as a set screw 120 and a set screw 121. These screws may define spaced legs to ride the bottom of the cam groove 112, and upon various relative adjustments of these screws 120—121 various feeding slopes may characterize the cam surface 119. These same screws 120—121 may also effect an adjustment in the height of the cam surface 119 and therefore in the fraction of the turret-feed cycle during which a cross-slide feeding movement will be derived at the particular indexed station (C'). A limiting abutment screw 122 in the turret 36 may longitudinally locate the cam 116 and thus provide further adjustment of the cross-slide feed for the particular index station.

For purposes of identification, we have labeled the successive turret-index stations, and corresponding primed identifications are given to the cross-slide-cam stations (recesses 112, flat 113) which correspond to the particular index stations. Thus, the station that is first effective after a new piece of stock has been fed out may be the station A (Fig. 4), and the same legend (primed) has been applied to the cam groove 112 which corresponds to the A station on the turret. The succeeding stations are labeled stations B, C, and D, and similar primed legends are applied to the cam grooves or slots 112 for these stations. The fifth station is the cut-off station, where we have labeled the flat 113 with the legend E.

In order to illustrate and other type of cross-slide operation derivable from cams in grooves 112, we have shown two such cams at the D station. At the D station, a first cam 125 may be provided for driving the forming slide 38 (see Figs. 4–7), and a second slide 126 may be provided for driving the cut-off slide 37. As will be noted from the phantomed locus 127 for the follower roll 115, and from the phantom locus 128 for the follower roll 114, the feed of the turret 36 at the D station may be accompanied by the simultaneous operation of a finish-form movement (cam 125) and of a preliminary cut-off movement (cam 126). The cam 125 utilized in finished forming may be an exact duplicate of the cam 116 for rough forming, the difference in the two forming functions being achieved solely by the difference in mounting of the two cams, as will be clear from the showings of Figs. 6 and 7.

As indicated generally above, the final cut-off operation may be performed at the fifth or E station of the turret; the means for effecting final cut off is shown in Figs. 4, 12, and 13. It will be recalled that all forming was completed before indexing to the E station, and therefore at the E station no cam is positioned for operation of the forming tool (109). Therefore, the final cut-off cam 129 is preferably formed so as to clear the follower roll 115 for all longitudinal positions of the turret 36.

The final cut-off cam 129 may comprise a base 130 to be secured and located, as at 131—132, on the E-station flat 113 of the turret 36. Integral with the base, a generally upstanding body may laterally clear the forming-slide-follower roll 115; the body may also be integral with a transverse mounting flange or bracket 133 to be anchored to the turret 36 as by a bolt 134. The cut-off cam surface may be defined by the periphery of an integral lateral projection 135 on the body of the cam 129; it will be seen from Fig. 13 that such periphery may include a relatively steep jump surface 136 which rapidly advances the cut-off tool 108 (or a blade) into the groove generated by the preliminary cut-off cam 126 at the preceding indexing station. Final cut off may be produced by a feed from a gentler slope 137, and the slope 137 preferably terminates relatively abruptly, well before termination of the forward feed of the turret 36. During the traversal of the cam surface 136—137, it will be appreciated that the follower roll 114 may produce a movement in accordance with the locus 114', the spring means 105 serving to return the roll 114 to a retracted position 138 well before completion of the forward feed of the turret 36 at the E station.

In a manner to be later described, the remaining period of the turret feed at the E station may be utilized for unchucking, stock-feeding, stock-stopping, chucking, and stock-positioning functions, and during this period the follower roll 114 may follow a straight unactuated path representing the normal retracted position of the follower roll 114. However, during retraction of the turret 36, one cannot tolerate a further actuation of the cut-off means toward the work, and we have provided a means for assuring that the cut-off will be held away from the work during turret retraction.

In the form shown, the bellcrank 93 for the cut-off slide is normally returned by spring means 105 to the normal retracted position represented by the designation 138 in Fig. 13. However, further freedom of movement may be permitted to the bellcrank 93 in a further retracting direction by employment of further torsion-spring means 140 (Fig. 1) acting on the rockshaft 94 in a direction opposed to the urging of the torsion spring 105. The normal retracted position of the bellcrank 93 may thus be determined not by any fixed abutment but upon the effective neutralizing or balancing of torsion springs 105—140 against each other. Thus, when the turret 36 is withdrawn at the E station, the follower roll 114 may engage the undersurface 141 of the cam 135. This surface 141 may quickly retract the bellcrank 93 and hold cut-off tool 108 well out of the way of newly fed stock throughout the entire withdrawal of the turret. Upon completion of turret withdrawal the follower roll may ride off the bottom flat 142 of the cam 135, and the spring means 140 acting against spring means 105 may return the follower roll 114 into a position for final cut-off feeds from surface 136—137 the next time the turret 36 is fed at the E station.

In accordance with a further feature of the invention we provide a novel means for automatically selecting separate desired feed speeds at the various turret stations and for changing these speeds during the indexing period so as not to cut short any of the time available for feeding operations. The transmission which we have shown forms the subject of a more complete discussion in the copending patent application of Charles A. Pethybridge, Serial No. 145,999, filed February 24, 1950. Such transmission may include a drive shaft 145 and a driven shaft 146. Clusters of gears of various sizes may be carried on each of these shafts and meshing with one another for use in various speed relations of the shaft 145—146. The gears on one of the shafts 145—146 may be keyed thereto, but only one of the gears on the other shaft will be engaged thereto at any one time. In the arrangement shown, the gears 147—148—149—150—151 are all keyed to the drive shaft 145, and the gears 152—153—154—155—156 mesh with the gears 147 . . . 151 but ride freely upon a sleeve member 157 on the driven shaft 146.

The drive shaft 145 may obtain its movement from a worm 158 on a shaft 159, the worm 158 being in mesh with a worm wheel 160 on the shaft 145. For setting-up purposes, we prefer that the worm wheel shall be readily disengageable from the shaft 145, and to this end a nut 161 and a locking collar 162 may be removed. Drive to the shaft 159 may be received from a pulley or sprocket 163 belted or chained at 164 (see Figs. 1, 3) to a suitable wheel 165 on the main drive shaft 38, as will be clear. When setting up the machine, and after the nut-and-collar means 161—162 have been removed so as to free the worm wheel 161 from the shaft 145, a slidable handle or crank 166 may be pushed to engage shaft 146 and then cranked in order manually to position the driven shaft 146 and all events timed thereby, as will be clear. The manually actuated movement or the gear-driven movement of shaft 146 may be imparted directly to the described feeding mechanism by means of a worm 167 (on shaft 146) and worm wheel 168 (on the camshaft 61).

As described more fully in the said copending patent application, the sleeve 157 is longitudinally shiftable relatively to the gears 152 . . . 156 and to the shaft 146. Detent means 169 may serve to hold one of a number of longitudinal placements of the sleeve 157, and these may be spaced in accordance with the spacing of gears 152 . . . 156. The sleeve 157 serves as a longitudinal locating means for an overrunning clutch which is preferably of the one-way engaging type and which may include a plurality of angularly spaced roller or like elements 170 to bind between a similar number of flats 171 on the shaft 146 and one of the bores of the gears 152 . . . 156, depending upon the longitudinal placement of the sleeve 157.

Longitudinal shifting movement of the sleeve may be imparted manually, as shown in the said patent application, or automatically, as from a timing cam or program drum 173 (see Fig. 1), which is preferably driven to make one revolution for each complete cycle of the machine, that is for each operation of the machine through all turret-index positions. Timing may be derived from the shaft of the idler sprocket 66, driving a pinion 174 meshing with a gear 175 (see Fig. 10)

on the program drum 173. Means may be provided for adjustably holding a number of cam elements 176—177—178—179 (see Fig. 14) about the periphery of the program drum 173, and a follower roll 180 may follow the successive slopes of the cams 176 . . . 179 as the program wheel rotates. The follower roll 180 may be carried by a shift-fork mechanism 181, which is shown in Fig. 10 to be axially located with respect to the shift sleeve 157 through thrust-bearing means 182.

In accordance with a feature of the invention, we drive the index mechanism at high speed while going through an indexing operation, and this period of high-speed drive may be utilized momentarily to free the clutch elements 170 to permit them to overrun so that one of the speed-changing cams 176 . . . 179 may be effective to produce a desired longitudinal positioning of the clutching means 170. At or just before the end of the indexing period, the high-speed drive may be removed so as to permit the clutch 170 to re-engage for a feeding operation. By having selected another gear in the nest of gears 152 . . . 156 another feed speed has been selected.

The auxiliary high-speed drive means may include an electric motor 183, which is shown coupled at 184 to the driven shaft 146 of the transmission. The motor 183 may be operated by appropriate switching means including a follower 185 to intercept alternate on-off cams 186—187 appropriately placed on the program wheel or drum 173, so as to drive the camshaft 61 and the index wheel 56 at high speed, preferably for the period commencing with completion of each turret feed and with termination of the index. It will be appreciated that under the described circumstances the only periods of slow-speed drive are those involving a feed of the turret; that the remaining periods of turret retraction and of indexing may be reduced to a minimum by means of the high-speed drive; and that, during such high-speed drive, the desired transmission speed for the next feed period may be selected automatically.

In describing an illustrative sequence of operation with the present machine, reference will be made to means for actuating a chuck or collet for holding the stock 20 in the spindle nose 19. Although such actuating means is not shown or described in detail, it will be understood to involve known mechanism and to be timed by the program wheel or drum 173. Thus, for the case of the present five-station machine, the chuck-actuating means 190 (Fig. 14) may be effective only once for every five cycles of rotation of the main feed cam 60. Likewise, although not specifically shown or described, the machine will be understood to be useful in conjunction with an automatic stock-feeding mechanism, and for timed operation of such stock-feeding mechanism another cam 191 may also rotate with rotation of the program wheel or drum 173.

In order to illustrate how a number of operations may be performed on the same piece of stock for a given cycle of operation of the machine, we show a drill 192 (see Fig. 4) mounted in a suitable tool holder 193 on the face of turret 36, at the first or A-station of the turret. At the B-station, a boring tool 194 mounted in a suitable holder 195 is positioned to enlarge the hole made by drill 192 or to counterbore the same. At the C-station, an outside chamfering tool 196 is supported in a suitable holder 197 for producing an outside chamfering cut on the front outside edge of the stock 20. At the D-station, an inside chamfering tool 198 is supported in a suitable holder 199 for producing a chamfer on the edge of the counterbore produced by the boring tool 194. Finally, at the E-station, a stock stop 200 is mounted so as to intercept stock fed out after cut-off and after unchucking, and yet prior to completion of the forward feed of the turret 36. It will be understood that many tools may be provided in duplicate at the various stations and that the single tools mentioned above are merely for the purpose of illustrating a possible set-up of the machine.

*Operation*

Referring to Fig. 14, let it be assumed that the cycle of operation of the machine commences just after the turret 36 has been indexed into the A-station. At that time, a fresh length of stock 20 has been fed out and is ready for the first operation. The index roll 55 leaves the Geneva slot 54 and, as it leaves, the rise 88 of cam 60 is effective to project the turret 36 into rigid locating alignment with the locating means 42—46—47. At the A-station (A'), there are no cams in the groove 112, and, therefore, neither of the cross-slides 37—38 will be operated. However, the feed of the turret 36 will be effective to drive the drill 192 into the work so as to produce a bore in the work. The feed speed for the turret will depend upon the selection effected by cam 179 in the transmission, and we have shown a selection of the fifth gear speed for this period at the A-turret station.

Upon completion of the forward feed, that is, when the follower roll 85 leaves the top of the rise 88 of cam 60, turret retraction will commence, and in the preferred arrangement shown cam 186 is then effective to connect the motor 183 for a high-speed drive of the shaft 146. Running at high speed, the shaft 146 overruns all the gears 152 . . . 156, thus effectively declutching the clutching means 170. At the same time, the high-speed drive hastens the retraction of the turret and makes possible a faster indexing operation. During turret withdrawal or during turret indexing, the cam 176 may be effective to change gear speeds in the transmission, and we have shown a change from the fifth speed for index-station A to the fourth speed for index-station B.

At index-station B, cam 60 again is effective to propel the turret 36 out of possible engagement with the indexing means and into located and locked condition for the full travel of the turret. Again, at the B-station, there are no cams for cross-slide actuation, and the only operation is the production of a counterbore by means of tool 194. After completion of the feed into the counterbore, the next cam 186 may again throw the drive into high speed for tool retraction and for rapid index; during this period, the cam 177 may be effective to change the transmission gearing to the first speed, for use at index-station C. Upon completion of indexing, the second cam 187 may disable or throw out the high-speed drive to permit a clutching-in of the newly selected first-gear speed.

At index-station C, the feed of turret 36 may be effective to produce a rough-forming cut involving an actuation of the cross-slide 38; at the same time, tool 196 may produce an outside-chamfering cut, while the cut-off slide 37 remains stationary and retracted. Upon completion of the rough-forming and of the outside-chamfering cuts, the third cam 186 may throw the mechanism into high speed for rapid turret withdrawal, for rapid index, and for another shift in transmission speeds, as to the second-gear speed under control of cam 178. At or upon completion of indexing, the third cam 187 may throw out the high-speed drive to permit a clutching-in of the selected second-gear speed for feeding the cam 60.

At the D-station, not only does the turret tool 198 produce an inside-chamfer cut, but at the same time cams 125—126 may also produce finish-forming and preliminary cut-off operations through the concurrent actuation of cross-slides 37—38.

Upon completion of these cuts at the D-station, a fourth cam 186 may throw the transmission into high speed for rapid turret withdrawal and for rapid indexing. If no change in feed speed is desired for the final cut-off operation, the mechanism may be left in the second speed as shown so that, upon completion of indexing, the fourth cam 187 may clutch the driven shaft 146 into the same second gear speed.

At the E-station, cam 129 produces a rapid jump of the cut-off tool while leaving the forming tool unactuated. The rapid jump may be followed by a short final cut-off, to drop a finished piece of work, as into the hopper-like bed 202 of the machine frame for passage along the chute 203 into a pan or the like (not shown) for the collection of finished articles. This final cut-off may be achieved substantially before completion of the turret-feed stroke at the E-station, and the remaining interval of the feed stroke may be utilized, first, for chuck-opening under the control of cam 190, followed by stock-feeding under the control of cam 191. The stock will be fed to a point determined by the instantaneous position of the stock stop 200 which, it will be recalled, is mounted on the turret 36 and is therefore still being fed as it receives abutment from the newly fed stock. Just before completion of turret feed at the E-station, the cam 190 may call for a resetting of the chuck, and the last or final movement of the turret feed may be effective to push the stock back slightly into the chuck, so that it may leave the stock in a known accurately determined position.

When the full-forward feed position of the turret is reached, a fifth cam 186 may throw the mechanism into high speed once more, for a fast withdrawal of the turret and for a quick indexing into the A-station for a repetition of the described cycle. During this last high-speed-driving interval, a gear-shifting cam 179 may return the feed-speed transmission to the first speed, in readiness for clutching-in upon operation of the fifth cam 187 at completion of indexing into the A-station.

*Alternative indexing and locating means*

As indicated generally above, it is a feature of our invention that accurate locating control of the turret may be maintained at all times, both during a feeding stroke and during an indexing operation. In Figs. 15, 16, and 17, we show a modified indexing and locating means whereby positive angular and locating control of the turret is assured at all times by having a short interval of locating-indexing overlap, during the transfer of angular control from the indexing means to the locating means and during the transfer of such control from the locating means to the indexing means. Since turret movement during control by the indexing means is in a totally different sense than during the period of locating control by the locating means, there must be some lost motion or clearance in the connections between the parts during the period of overlap. Such lost motion may be provided as an angular lost motion effective upon entrance of the locating key 204 into the locating block 205 at the beginning and at the end of the longitudinal stroke cycle of the turret, or, alternatively, the lost motion may be included in the connection between the shaft 62' driving the index arm 56' and the index arm 56' itself. However, in the form shown, the lost motion is effectively provided at the point of connection or engagement between the index roll 55' and a particular Geneva or index slot, such as slot 206 of Fig. 15.

In order to provide the indicated lost motion between the index roll 55' and one of the Geneva slots, and at the same time in order to permit the index roll 55' to commence its working or indexing engagement in one of the indexing slots with a tangential engagement, as for utmost smoothness of operation, we have provided the effective lost motion by extending the index slots, such as the index slot 206, radially outwardly of the point of tangential roll-engagement, as denoted in Fig. 15 by the radial increment ΔR, and for the radial extent of this increment ΔR we have caused the mouth of the slot 206 to diverge. In the form shown, this divergence may be at a relatively small angle with respect to the inclination of the walls of slot 206, and in a particular use of our invention this angle has been three degrees, as indicated by the angles δ for the outer walls of the slot 207 in Fig. 15.

As before, the Geneva wheel may be mounted on the turret, and the timed relation between rotation of the index arm 56' and the turret-feed stroke imparted by the main cam 60 is preferably such that, while the center of the index roll 55' (as viewed about the axis of the shaft 62') is within the divergent mouth 209 of one of the index slots, a locating key 204 is in engagement with the locating means 205, and this relationship applies both upon commencement of an indexing engagement and upon termination thereof. To prevent fouling of parts, the locating key 204 and the locating block 205 are preferably not in engagement for a short instant while the center of indexing roll 55' is just radially outside (in the sense radially about the axis of the shaft 33) the outer working limit of the indexing slots 206—207—208.

The described relationship may be better understood from a description of a typical cycle of operation, commencing near the termination of a retracting stroke of the turret. Toward the end of such retracting stroke, the parts may be in the longitudinal and angular relationship designated in dotted outlines of Figs. 15 and 16, wherein the locating key 204 is still in engagement with the locating block 205 as indicated by the symbol U'. At the same time, the index roll, which is being driven continuously by the shaft 62', will be in the position designated U just outside the projecting divergent mouth 209 of the index slot 206.

An instant later, the index roll 55' will have actually entered the divergent mouth 209, as designated by the symbol V, and the locating key 204 will be seen to be still in longitudinal locating engagement with the locating block 205; thus, even though the index roll 55' is located (with lost motion) within the index slot, completely accurate angular position of the turret is maintained by the engagement at V'. An instant later, the locating key 204 will pass out of engagement with the locating block 205; and, by the time the indexing roll 55' tangentially engages the working limit of the index slot 206 (roll position designated generally by the symbol W), the locating key will longitudinally clear the locating block 205, as by the amount 210 shown in Fig. 16. At this time, angular control of the turret will have been wholly transferred to the indexing mechanism, and the arm 56' will proceed with its continuous motion to effect an indexing of the turret.

Upon completion of indexing, the index roll 55' will be at the location designated generally X, tangentially related to the straight or working stretch of one of the indexing slots (207) in the Geneva wheel. The roll 55' will, however, be well within the slot (207) and will not until it reaches the position designated Y will it begin actually to leave the slot. However, while progressing from position X to position Y the roll 55' proceeds through the divergent mouth of the slot 207, so that no further indexing can take place during such movement. At the same time, that is, while the index roll is proceeding from position X to position Y, the main feed cam is preferably effective to advance the turret from position X' to position Y' (see Fig. 17), and it will be appreciated that during the first part of this movement (between positions X' and Y') the clearance 210 between the locating key and the locating block will have been quickly covered and the locating key will have entered and positively engaged the locating block.

Further feed of the turret may advance the loacting key to a position shown generally as Z', with the locating key well within the locating block. At this time, the index roll will be at the position Z and will just begin longitudinally to clear the radial plane of the indexing slot.

It will be clear that with the described construction there may never be any loss or uncertainty of angular control of the turret. Provision against loss of angular control is assured by the overlapping relation of the locating and indexing mechanisms, and lost motion in one of these mechanisms during the period of overlap assures against fouling or binding of one of the mechanisms.

*Alternative cut-off mechanism*

In accordance with a further feature of the invention we have provided a novel construction whereby the cut-off function may be performed by a tool carried on the same forming slide as that on which a forming tool is mounted. In other words, with our improved construction all forming or cross-slides may be utilized for forming operations, and the cut-off function may be performed by one of these slides. A preferred arrangement for accomplishing this result is shown in Figs. 18 through 21.

Our improved cut-off attachment comprises in essence a slide upon a slide, and provision is made for selectively additionally feeding the additional or cut-off slide. The cut-off attachment may be mounted upon the exposed side of the forming slide 38, which may have the same actuating means and program as discussed above. The cut-off attachment may comprise a base plate or frame member 220, which may be anchored to the slide 38 so as to be reciprocable therewith. The base plate 220 may be grooved or recessed, as at 221, for the guided reception of the cut-off slide 222. Plates 223—224 may be anchored to the base plate 220 so as to overlap parts of the slide 222 at the recess 221, thereby securely locating the same for its sliding movement. Sliding movement of the slide 222 is preferably in the same general direction as the feed of the regular forming slide 38, and in the form shown both slides 38 and 222 have parallel movements. The slide 222 may carry suitable means for securely holding a cut-off tool 225 which is shown supported between wedge blocks 226—227 at a slight elevation with respect to the movement of slide 22. A force-distribution plate 228 may be laid over one of the wedge blocks and clamped securely thereto, as by bolts 229. An adjustable back-stop member 230 may abut the tail end of the tool 225 to prevent any loss of the adjustment once the tool has been set, as will be clear.

The feeding means for the cut-off slide 222 may be a cammed or other system of levers, but in the form shown we employ pneumatic means including a double-acting cylinder 231 carried with the tool slide 38. The cylinder 231 may be anchored to a frame member 232, which in turn is secured to the base plate 220. Means are provided for translating generally vertical movement of the piston (in the cylinder 231) into horizontal displacement of the cut-off slide 222. To effect this movement we have shown a cross-head or guide block 233 reciprocably guided in upstanding ways 234 defined by frame members or rails secured to the exposed face of the frame or base plate 220. The crosshead block 233 may be driven by a pin connection 235 to the piston rod 236, and a cam program 237 may be milled or routed out of one face of the crosshead 233. To follow the cam program 237, the cut-off slide 220 may fixedly carry cam-follower means such as a pin 238. The pin 238 may project through a part of the frame member 220, and it will be clear that a horizontal slot or opening 239 in the frame member may permit full longitudinal freedom for the follower 238 and for the slide 222.

We prefer that the cylinder 231 shall not be effective to feed the cut-off slide 222 during any cutting operation, but that it shall merely serve quickly to project or retract the cut-off slide with respect to the forming slide; thus, for the most part, the cut-off slide 222 will be in either a projected or a retracted position relatively to the forming slide 38. When in these positions, the follower pin 238 preferably is firmly engaged by both walls of the cam slot 237, and at such engagement these walls, or at least the walls which sustain the action from the cutting thrust, are substantially perpendicular to the sliding movement of the slide 242; thus, whatever the thrust, there will not be a tendency to move the crosshead 233 and the cut-off tool position will be held firmly. It will be clear that by slightly converging the walls of the cam slot 237 at one or both ends thereof, as at 237' (Fig. 18), assurance may be had of tight engagement between the parts whenever cutting takes place. The crosshead or driving slide 233 may be formed with or may carry a block 240, carrying an adjustable stop screw 241 positioned to project below the slide 233 for abutment with the frame member 232, so as to limit the downward stroke of the piston in the cylinder 231. The set-screw means 242 may hold a given such abutment.

With the described arrangement, it will be clear that when the piston rod 236 is projected vertically, the cam 237 will drive the cut-off tool 225 into a forward projected position relatively to the forming slide 38. When the piston rod is actuated in the opposite direction, the cut-off tool will be retracted. In Figs. 18 and 20, the cut-off tool is shown retracted relatively to the forming tool 109, and in Fig. 21 the cut-off tool is shown projected relatively to the forming tool 109.

In a typical cycle of operation, the combined slides 222 and 38 may be utilized at at least two stations—at three stations, if the forming tool 109 is to produce rough and finish cuts. In the latter event, the cam 116 may be effective to produce a rough-forming cut when the turret is indexed in station C, as previously described, and during this operation the cut-off tool 225 may be more or less aligned with the forming tool 109, so that rough forming may be accompanied by a preliminary cut-off. At the next station (station D), cam 125 may be effective to produce a finish-form cut, and the cut-off tool 225 may merely go along to add to the depth of the preliminary cut off.

At the cut-off station E, however, means such as a cut-off slide jump cam 245 (see Fig. 14) timed by the main camshaft may be effective to actuate control-valve means (not shown) for the cylinder 231 in order to jump the cut-off tool 225 with respect to the forming slide 38. This jumping operation preferably takes place while the forming slide 38 is fully retracted and the extent of the jump is preferably no greater than the total feed produced by the finish-form cam 125. Thus, it will be clear that, upon jumping the cut-off slide 225 to the forward position, the tool may merely "cut air" and will not engage the work. Only when a cut-off cam such as the cam 135 becomes effective will the cut off tool 225 be fed into the work in order to produce the final cut-off operation. Immediately upon completion of the final cut-off stroke cam 245 (Fig. 14) may be effective to snap the cut-off slide 222 back, and the described cycle of operations may be repeated.

It will be clear that with our improved cut-off slide, it is not necessary that one forming slide be devoted solely to cut-off functions. This feature lends itself in machines other than that presently described; in the present case, its use is particularly flexible, in that separate feed programs are available for each indexed station of the turret, so that even with the multiple functions performable by the single forming slide 38, these functions may all be performed at the most desirable cutting speeds for each function.

It will be seen that we have described a machine adaptable with great flexibility to the simultaneous performance of a number of varied operations. The machine is so arranged as to operate the various mechanisms with complete synchronism and yet with a minimum of parts. In spite of the relatively few parts there may be complete freedom in the choice of relative speeds of feed for a number of independently movable slides. The machine may be completely automatic and is adaptable with a minimum of set-up time to virtually unattended automatic operation.

While we have described our invention in detail for the preferred forms shown, it will be understood that modifications may be made within the scope of the invention as defined in the appended claims.

We claim:

1. In a machine of the character indicated, fixed elongated cylindrical guide means a slide longitudinally slidable guided by said guide means and indexible about the axis of said guide means, feed means for said slide and including a rotatable member and means for continuously rotating said member, indexing means including a driven element fixed to and therefore carried with said slide and a rotatable driving element separate from said slide and engageable with said driven element at one relative longitudinal position of said slide and of said driving element, locating means including a frame-based fixed member and a member fixed to said slide, said members being longitudinally slidably engaged at one indexed position of said slide except when said indexing means is in said one relative position, and a synchronizing continuously rotatable connection between said feed means and said driving element.

2. In a machine of the character indicated, a frame, a longitudinally movable slide and Geneva-wheel means thereon, Geneva-arm means, said slide and said Geneva-arm means being relatively longitudinally movable from a position out of possible longitudinal engagement to a position of possible longitudinal engagement, and locating means effective to locate said slide for movement in longitudinal positions other than said position of engagement with said Geneva-arm means, said locating means including a member fixed to said frame and a member fixed to said slide, said members being angularly registered for longitudinally sliding engagement in one indexed position of said slide.

3. In a machine of the character indicated, a frame, a slide movable on a longitudinal axis, Geneva-wheel means fixedly carried at one end of said slide, a Geneva arm, means for constantly rotating said Geneva arm about an axis offset from said longitudinal axis, said arm and said Geneva-wheel means being longitudinally engageable for one relative longitudinal position of said arm and of said slide, locating means effective to locate an indexed position of said slide for relative positions of said slide and of said arm other than said one relative longitudinal position, said locating means including a member fixed to said frame and a member fixed to said slide, there being between said Geneva-wheel means and said arm an angular clearance about said longitudinal axis upon axial engagement of said arm with said Geneva-wheel means and there being a region of longitudinal overlap in the effectiveness of said locating means to locate said slide and in the effectiveness of said arm to engage said Geneva-wheel means, whereby control of the angular orientation of said slide about said longitudinal axis may never be lost regardless of the relative longitudinal position of said slide and of said arm.

4. In a machine of the character indicated, a longitudinally movable slide, a cross slide slidable generally transversely to the movement of said longitudinal slide, feed means for one of said slides, a cam follower for actuating the other of said slides, indexible cam means carried with said one slide and coacting with said follower upon a feed of said one slide for feeding the other of said slides in accordance with the program at the indexed position of said cam means, and means synchronized with the cycle of said feed means for indexing said cam means.

5. In a machine of the character indicated, a generally longitudinally movable slide, a cross slide movable generally transversely to said longitudinally movable slide, feed means for one of said slides, indexible cam means including a plurality of cam programs successively positioned upon indexing and coacting between said slides upon the feed of said one slide for feeding the other of said slides, indexing means for said cam means, locating means for said indexible cam means for locating an indexed position of said indexible cam means, and synchronizing means for said indexing means, and for said locating means and coupled to said feed means, said locating means being effective for the extent of coaction between said slides.

6. In a machine of the character indicated, a longitudinally movable slide, a cross slide movable generally transversely of said longitudinal slide, feed means for one of said slides, indexible cam means carried by one of said slides and including a succession of separate cams successively moved into coacting relation with the other of said slides upon the feed of said one slide for feeding the other of said slides at each of a succession of indexed positions, said coacting cam means being effective during one part of the total feed of said one slide, and indexing means for said indexible cam means and engageable with said one slide for another part of the feed of said one slide, said indexing means being effectively disengaged from said indexible cam means during said first part of the feed of said one slide.

7. In a machine of the character indicated, a longitudinally movable slide, a plurality of transversely movable slides, said longitudinally movable slide being indexible and including separate indexible individually adjustable actuating means at each of a plurality of indexed positions, separate followers for actuating the other of said slides, successive of said actuating means being successively brought into actuating relation with said followers upon an indexing of said longitudinal slide, whereby various feed movements of the others of said slides may be determined for various indexed positions of said longitudinal slide, whereby upon a feed of one of said slides the movements of all said slides may be coordinated with each other, and further whereby the relationship of these movements may be determined in accordance with the indexed position of said indexible slide.

8. In a machine of the character indicated, a longitudinally slidable turret indexible about its sliding axis, means for indexing said turret to successive angular positions, feed means for said turret, further slide means supported for movement in a sense other than that of said turret, longitudinally extending cam means on said turret effectively carried off the indexing axis of said turret, and actuating means for said other slide including cam-follower means positioned for engagement with said cam means upon a feed of said turret for one indexed position of said turret.

9. A device according to claim 8, wherein further cam means are supported on said turret and positioned for engagement with said follower means at another indexed position of said turret, whereby said further slide means may be given different feeding movements for feeds of said turret at said two indexed positions of said turret.

10. In a machine of the character indicated, a slide having freedom for movement from one extreme position to another extreme position, yieldable means urging said slide for retraction to a position intermediate said extreme positions, actuating means for said slide for feeding said slide out of said intermediate retracted position and toward one of said extreme positions, said actuating means including means positively further retracting said slide past the retracted intermediate position and toward the other of said extreme positions, whereby in a normally retracted position of a tool carried by said slide said tool may be maintained relatively close to the work, and further whereby said tool may be retracted further away from the work than in said normally retracted position, as when a new piece of stock is fed out immediately following a cut-off operation.

11. In a machine of the character indicated, work-supporting means and tool-supporting means, one of said means being indexible, indexing mechanism for said indexible means and including a member engageable with said indexible means during a part of the cycle of the movement thereof, feed mechanism for one of said means and including a main camshaft, means continuously connecting said camshaft and said indexing mechanism for continuously coordinated movement, drive means including a variable-speed transmission connected to drive said indexing mechanism and said camshaft, said transmission including overrunning - clutch means, auxiliary high-speed-drive means for driving said camshaft and said indexing mechanism at high speed as permitted by said overrunning clutch, and timing means in synchronized driven relation with rotation of said camshaft, said timing means including means introducing said auxiliary high-speed-drive means during the period of engagement of said indexing mechanism with said indexible means, said timing means further including means for selectively shifting said transmission during operation of said auxiliary high-speed-drive means, whereby said indexible means may be rapidly indexed and whereby during such index there may be no load on said transmission so that said transmission may be shifted in order to provide a different camshaft speed for each of two indexed positions of said indexible means.

12. A device according to claim 11, in which said timing means is connected for driving rotation at a reduced speed relatively to rotation of said cam-shaft, and in which the speed-reduction ratio is the reciprocal of the number of indexible positions of said indexible means, whereby one cycle of movement of said timing means may govern different events taking place at each of the indexed positions of said indexible means.

13. In a machine of the character indicated, two independently movable slides, indexing means for one of said slides, feed means for one of said slides, actuating means for the other of said slides, and means for differently coordinating the relative movements of said slides for two indexed positions of the indexible slide, said last-defined means including separate members carried with the indexible slide and separately positioned for cooperation with said actuating means in accordance with the indexed position of the indexible slide.

14. In a machine of the character indicated, a frame, a frame-fixed elongated cylindrical guide member, work-supporting means and tool-supporting means, one of said means being a slide longitudinally movable on said guide member, indexing means for said slide and including a Geneva-wheel member longitudinally fixed to said slide and a Geneva-arm member for indexing said slide about a longitudinal axis, longitudinal feed means in longitudinally actuating relation with said slide for moving said slide and said Geneva-arm member longitudinally into and out of a position of possible indexing engagement, fixed longitudinally slidably engageable locating members on said frame and on said slide for holding an indexed position of said slide during a stroke of said feed means, said indexing means being engaged when said locating means is disengaged and said locating means being engaged when said indexing means is disengaged and there being an overlap interval in which both said indexing means and said locating means are engaged, whereby angular control of said slide is maintained, one of said members including lost-motion means effective during said overlap interval, whereby positive engagements are possible during said overlap interval.

15. A machine according to claim 14, in which said lost-motion means is provided in said Geneva-wheel member and comprises divergent-mouthed Geneva slots diverging radially outside the points of driven engagement with said Geneva-arm member, the divergence of said slots commencing substantially at the point of tangential engagement of said Geneva-arm member with said Geneva-wheel member.

16. In a machine of the character indicated, a generally longitudinally movable slide, means for indexing said slide about a longitudinal axis, a cross slide movable generally transversely of said longitudinally movable slide, guide means on said cross slide, a further slide slidable on said guide means, feed means for said longitudinally movable slide, and indexible cam means carried by said longitudinal slide and variously coacting between said longitudinal and cross-slides upon the feed of said longitudinal slide at different indexed positions for variously feeding said cross slide, said feed means further including means for feeding said further slide relatively to said one slide.

17. A machine according to claim 16, in which said means for feeding said further slide comprises pressure-responsive means coacting between said further slide and said one slide, and control means for said pressure-responsive means.

18. In a machine of the character indicated, a cross slide including guide means, a cut-off slide slidably guided by said guide means and therefore movable relatively to said cross slide, and means for actuating said cut-off slide relatively to said cross slide, comprising reciprocable cam means slidably guided on one of said slides and including a cam-follower member carried on the other of said slides and coacting with said cam means, said reciprocable cam means being guided for movement generally perpendicular to the movement of said cut-off slide relatively to said cross slide.

19. In a machine of the character indicated, a frame, fixed elongated cylindrical guide means, a slide having a bore longitudinally slidably guided on said guide means and indexible about the axis of said guide means, longitudinally acting feed means for said slide and including a rotatable member, indexing means for said slide and including a driven element fixed to said slide and a longitudinally fixed rotatable driving element separate from said slide and engageable with said driven element at one relative longitudinal position of said slide and of said driving element, a common unidirectional rotary drive for said driving element and for the rotatable member of said feed means, and locating means including a member fixed to said slide and a member fixed to said frame and longitudinally slidably engageable for all positions of said slide.

20. In a machine of the character indicated, a longitudinally movable slide, two cross slides slidable generally transversely to the movement of said longitudinal slide, feed means for said longitudinally movable slide, indexible cam means carried by said longitudinally movable slide and including a plurality of cams indexed successively into actuating relation with said cross slides for feeding said cross slides upon operation of said feed means, and means synchronized with the cycle of said feed means for indexing said cam means.

21. A machine according to claim 20, in which said cam means includes at one indexed position thereof two separate cams in separate actuating relation with said cross slides.

22. In a machine of the character indicated, a longitudinally movable slide, a cross slide generally transversely movable with respect to said longitudinal slide, indexible cam means carried by one of said slides, feed means for one of said slides, and means for coordinating the relative feeding movement of said slides, including a lever fixedly pivoted and following an indexed part of said cam means.

23. In a machine of the character indicated a frame, an indexible turret, frame-based elongated guide means for said turret and about which said turret is indexible, spindle means journaled in said frame on an axis offset from the axis of said guide means, said turret including a drum cylindrical about the axis of said guide means and of a radius exceeding the spacing between said axes, and feed means for said drum including a unit slide and guide means, said slide and drum including interfitting axial-abutment means, and said guide means wholly supporting said slide and including bracket means for removable attachment to said frame.

24. A machine according to claim 23, in which said drum includes a plurality of locating abutments corresponding to the number of index positions of said turret and angularly spaced about the periphery of said drum, and a single locating member on said frame to engage successive of said locating abutments following successive indexing operations.

References Cited in the file of this patent

UNITED STATES PATENTS

| Number | Name | Date |
|---|---|---|
| 269,790 | Johnston | Dec. 26, 1882 |
| 574,162 | Prentice | Dec. 29, 1896 |
| 739,501 | Meyers | Sept. 22, 1903 |
| 1,703,986 | Brown | Mar. 5, 1929 |
| 1,896,052 | Ferris | Jan. 31, 1933 |
| 2,008,010 | Foster | July 16, 1935 |
| 2,270,310 | Kelley | Jan. 20, 1942 |
| 2,321,393 | Kelley | June 8, 1943 |
| 2,560,686 | Curtis | July 17, 1951 |